United States Patent Office 3,117,857
Patented Jan. 14, 1964

3,117,857
PRODUCTION OF MIXED FERTILIZERS
Charles D. Goodale, Terre Haute, Ind., and Robert E. Szold, Monroe, La., assignors to Commercial Solvents Corporation, New York, N.Y., a corporation of Maryland
No Drawing. Filed Sept. 14, 1959, Ser. No. 839,560
16 Claims. (Cl. 71—43)

Our invention relates to a method of producing solid nitrogen-containing fertilizers. More particularly, it relates to the production of solid nitrogen-containing fertilizers by the use of substantially anhydrous nitrogen solutions.

Variations in soil deficiencies and the variations in the nutrient requirements of different plants, as well as the variations in the requirements of particular plants during different stages of their growth in recent years have led to the use of mixed fertilizers of fairly widely different compositions. Basically, mixed fertilizers consist of nitrogen, phosphorus and potassium compounds in varying proportions of two or all three of these elements and frequently the compositions include also varying amounts of so-called secondary and trace elements. The desirability for a practical and economical process for producing mixed fertilizers in solid pulverized or agglomerate form is one of the primary objects of our invention.

The nitrogen of mixed fertilizers is ordinarily obtained from ammonia, or one or more of its various derivatives, such as ammonium nitrate, nitrogen solutions, urea and the like. Phosphorus is found in nature in the form of deposits of insoluble phosphate rock and certain crystalline apatites which must be converted into a more soluble (citrate-soluble) form in order to make them useful as plant food. Potassium is available to the fertilizer industry in various forms, such as potassium chloride, potassium sulfate, potassium nitrate, potassium-sodium nitrate, potassium magnesium sulfate, etc.

One of the chief problems in the formulation of mixed fertilizers is the incorporation therein of the phosphorus in a form which is readily available as a plant food and at the same time not too quickly lost in the soil. Phosphate rock, for example, is too insoluble to be satisfactory and, the acidic nature of phosphoric acid makes it hazardous and difficult to handle. These difficulties are generally overcome by incorporating both the nitrogen and the phosphorus in the form of ammoniated normal or triple superphosphates, in which form both the nitrogen and phosphorus are quite readily available to the growing plants.

The amount of nitrogen which can be added to a fertilizer during the ammoniation of the superphosphate with ammonia or nitrogen solution is limited by the percentage of the normal or triple superphosphate present and the degree of water - vs. citrate-solubility desired in the case of the phosphate salts. Additional nitrogen is frequently desired in a fertilizer and this has been obtained in the past by adding solid nitrogen compounds or by the ammoniation of acids such as sulfuric or phosphoric acids with nitrogen solutions, the latter being composed of varying ratios of ammonium nitrate, urea or other solid forms of nitrogen dissolved in aqueous ammonia.

The physical condition of mixed fertilizers has been a problem of the fertilizer industry for many years. The manufacture of a free-flowing mixture not subject to bag-set has been more of a problem during the past few years than formerly. This has been due, in part at least, to the attempt to make higher analysis fertilizers and this in turn has led to the use of more solution-nitrogen which introduces more water and to the use of more concentrated materials, some of which are hygroscopic and tend to undergo undesirable chemical reaction in mixtures more readily than materials formerly used, especially at elevated storage temperature and at what was formerly normal moisture content.

The difficulties involved in the production of suitable pulverized or granular mixed fertilizers with good storage characteristics have been increased by the problems involved in the process of obtaining in either partially or completely agglomerated or granular form the various mixtures in order to place them in a physical form more suitable for storage and use by the consumer. The latter problems require the use of special agglomeration techniques to minimize caking, segregation, dustiness and poor drillability of the product, as well as special manufacturing procedures required to produce such products. In the most generally used process, the mixture of relatively dry solids is brought into agglomerated or partially agglomerated state by the use of heat and the addition of liquid during suitable agitation. The process involves treating a mixture of solids with an ammoniating solution and in many cases an acid, both containing water which, with the heat of reaction, forms a moderately hot, friable mass that is agglomerated by controlling tumbling of the mass and then congealed by cooling and drying. The addition of recycled solid material is ordinarily necessary to dry and cool the material so that suitable agglomeration into discrete granules is obtained.

In carrying out the process of our invention, we have discovered that a particularly desirable physical form of solid nitrogen-containing mixed fertilizers of the pulverized, partially granulated or granulated type can be obtained with important savings in manufacturing costs by the introduction of the desired amount of nitrogen into the mixed fertilizers and/or the ammoniation of the mixed fertilizers by using as the ammoniating agent substantially anhydrous nitrogen solutions; i.e., substantially anhydrous ammonium nitrate and/or other soluble, neutral nitrogen compounds, dissolved in substantially anhydrous ammonia. When using conventional nitrogen solutions, the amount of nitrogen that can be added to a mixed fertilizer is limited by the excessive liquid phase resulting from the presence of soluble salts, the heat of reaction of the free ammonia with acidic compounds, plus the water present in the solid materials or introduced as a component of the nitrogen and acid solutions. The heat of reaction increases the temperature of the mixture so that more and more of the water-soluble salts are dissolved in the water, thus rapidly increasing the liquid phase to a point where the addition of the conventional solution and acid must be discontinued to avoid producing an unmanageable, wet, muddy mass. With our new process employing substantially anhydrous nitrogen ammoniating solutions, appreciably more solution-nitrogen can be employed without producing the excessive and objectionable amount of the liquid phase. With these solutions, there is only the heat of solution and no added water from the solution to increase the amount of liquid phase. The latter, therefore, remains relatively constant, since there is sufficient heat developed to evaporate substantial quantities of water, including that added in the form of an aqueous solution of an acid such as sulfuric or phosphoric, thus offsetting the increasing amounts of soluble salts as the nitrogen solution and acid are added. With the use of these anhydrous solutions in our process, the ammonium nitrate or other water-soluble salts or compounds such as urea, become more soluble as the temperature increases. However, this increase in temperature also tends to evaporate moisture which increases the concentration of the salt solution. As this concentration increases, any moisture present becomes more and more difficult to remove, thus tending to stabilize the amount of liquid phase in the fertilizer at the desired point.

Our new process employing substantially anhydrous nitrogen solution permits the production of nitrogen-containing solid fertilizer materials with minimum or no recycling and supplemental drying in many cases where this was not possible with previously commercially available nitrogen solutions. It thus provides a substantially simpler and easier method for the production of solid fertilizer materials than was possible using previously available nitrogen solutions.

In carrying out our improved process for the production of solid inorganic nitrogen-containing fertilizers, with substantially anhydrous nitrogen solutions (i.e., containing usually 0.2 to 0.8% water) we can use nitrogen solutions containing substantially anhydrous ammonia in amounts ranging from 15% to 60% and substantially anhydrous ammonium nitrate or other solid nitrogen compounds, in amounts ranging from 85% to 40%.

Our improved process for the production of solid nitrogen-containing mixed fertilizers is carried out by reacting substantially anhydrous nitrogen solutions with an acidic material usually in the presence of solid fertilizer materials. The solid fertilizer materials can include any materials ordinarily used in the production of mixed fertilizers including the inorganic phosphates, such as normal superphosphate, and triple superphosphate, potassium-containing material such as potassium chloride, nitrogen-containing material such as ammonium nitrate, ammonium sulfate, urea and the like. The acidic material can be an acid such as sulfuric acid, phosphoric acids, or nitric acid or other acid-reacting material such as, for example, the acids or acid salts of superphosphate, and triple superphosphate, or other material which reacts exothermically with ammonia.

Our improved process is applicable to all of the same general types of material ammoniated with aqueous nitrogen solutions and is especially adapted to incorporation of more solution-nitrogen into the mixture. The same type equipment and the same type of ammoniation procedure is employed as with aqueous nitrogen solutions. We are, however, able to obtain thereby satisfactory physical conditions including granulation or agglomeration at low moisture content without the prior preparation of high moisture content plastic mixtures of the fertilizer materials, and in addition, substantially more of the desired nitrogen content can be supplied more conveniently and economically by the substantially anhydrous nitrogen solutions than is possible or practical with the conventional nitrogen solutions employed in the prior ammoniation processes. A suitable form of apparatus for ammoniation and agglomeration or granulation by our improved process is either a batch mixer or the TVA continuous ammoniator described in Farm Chemicals, volume 17, Nos. 7 and 8, July and August 1954. Another suitable form of apparatus is that described in Chemical Engineering Progress by Hardesty, June 1955, pp. 291–295. These ammoniators consist essentially of drums in which the substantially anhydrous nitrogen solution is thoroughly incorporated with the solid fertilizer material or the solid fertilizer material and acid. Agitation is supplied by agitators or by rotation of the drums. The exothermic reactions which take place between the increased amounts of solution-ammonia and the acidic materials produce sufficient reaction heat to increase the solubility of the salts present, and thus provide the critical amount of liquid phase required for granulation at a substantially lower water content followed by the removal of any excess water present in the solid fertilizer material by agitating and aerating the hotter granulated or semi-granulated mixture. As a result production rates are increased, quality improved and costs lowered since less or no recycling of the dried or partially dried fertilizer is required than is normally the case when aqueous nitrogen solutions are employed and the need for drying is eliminated or appreciably reduced.

When using our substantially anhydrous nitrogen solutions for the ammoniation of phosphate salts such as ordinary superphosphate, triple superphosphate, or mixtures thereof, the basic free, or neutralizing ammonia, in the nitrogen solution first reacts with the active free acid in the superphosphate to neutralize the free acid ordinarily present. The amount of ammonia required to ammoniate the acid salts can be figured on the basis of the ratio of the weight of the ammonia to the weight of $P_2O_5$ in the normal, super- or triple superphosphate or its equivalent. With good equipment and proper operating conditions, it is considered good practice to use an ammoniation rate (pounds of free ammonia per unit, or 20 lbs. of $P_2O_5$) of about 6 lbs. in the case of normal superphosphate, and about 4 lbs. in the case of triple superphosphate. All the resulting reactions are considered desirable as the neutralization of the free acid and acid salt improves the mechanical condition of the mixture and little, if any, of the phosphates is converted to a form unavailable the growing crop. If ammoniation is carried out substantially above the limits just mentioned excessive reversion of the phosphates to forms which are only partially available as plant foods may occur. To avoid this danger of reversion at higher ammoniation rates and to obtain the advantage of using more solution-nitrogen in a mixture, we prefer to incorporate with the solid fertilizer an acid such as sulfuric, phosphoric or nitric acid which upon reaction with the ammonia from the substantially anhydrous nitrogen solution forms the corresponding ammonium salt and liberates the amount of heat required to give a product which requires a minimum of drying, if any. Unlike the case where conventional water-containing nitrogen solutions are used, none of this heat is required to evaporate water added with the nitrogen solution. For both economical and technical reasons, it is preferred to use the acid, phosphates and nitrogen solution in such proportions that the ammonia from the substantially anhydrous nitrogen solutions is just sufficient to react with the acid and to ammoniate the phosphates to the levels mentioned above so as not to leave the finished fertilizer unduly acid or so as not to cause reversion of the phosphate or to cause undue losses of unneutralized ammonia. The amount of nitrogen solution and other material required to give a finished fertilizer of the desired plant food contents as well as to give a product of the desired degree of dryness can be readily calculated.

In order to illustrate the method of operating our improved process, as well as the advantages obtained thereby, the following experiments were carried out.

In a run using a TVA continuous ammoniator, a mixture of 495 lbs. normal superphosphate, 675 lbs. triple superphosphate and 340 lbs. of muriate of potash was passed through a TVA type ammoniator at a rate of 17.5 tons per hour. A total of 80 lbs. of 90% concentration sulfuric acid was introduced into the above mixture and a total of 448 lbs. of substantially anhydrous nitrogen solution containing 76.45% ammonium nitrate, and 23.36% ammonia added at rate so as to neutralize the sulfuric acid and acid salts before the mixture left the ammoniator. Excellent granulation was obtained and the moisture content of the material discharged from the ammoniator was 2.84% versus 4.0% obtained when using aqueous nitrogen solutions under similar conditions.

| | |
|---|---|
| Temperature of product from ammoniator___° F__ | 232 |
| Temperature of discharge product in storage pile _____° F__ | 130 |
| Percent total nitrogen in product_____ | 10.62 |
| Percent ammonia nitrogen_____ | 7.56 |
| Percent $NO_3$ nitrogen_____ | 3.06 |
| Percent total $P_2O_5$_____ | 19.92 |
| Percent water soluble $P_2O_5$_____ | 8.99 |
| Percent citrate insoluble $P_2O_5$_____ | 1.59 |
| Percent APA_____ | 18.33 |
| Ratio of water soluble $P_2O_5$ to citrate soluble $P_2O_5$ _____ | 0.490 |
| Percent water_____ | 2.84 |
| Free acid percent $NH_3$ pH 20% soln_____ | 0.13 |
| Ammoniation efficiency percent_____ | 102.1 |

A sample of 8–16–0 mixed fertilizer was produced following the same procedure described above by treating 1665 lbs. of normal superphosphate with 75 lbs. of 90% sulfuric acid and 360 lbs. of substantially anhydrous nitrogen solution. The product of the reaction agglomerated readily to a commercially satisfactory dry product of the following composition.

| | |
|---|---|
| Percent total nitrogen_____ | 7.93 |
| Percent $NH_3$_____ | 5.64 |
| Percent total $P_2O_5$_____ | 17.02 |
| Percent water soluble $P_2O_5$_____ | 9.24 |
| Percent citrate insoluble $P_2O_5$_____ | 0.85 |
| Percent APA_____ | 16.17 |
| Ratio of water soluble $P_2O_5$ to citrate soluble $P_2O_5$ _____ | 0.571 |
| Percent water_____ | 2.11 |
| Ammoniation rate/unit $P_2O_5$_____ | 4.77 |
| Ammoniation efficiency, percent_____ | 101.9 |

A sample of 15–0–15 mixed fertilizer was prepared as described above by treating a mixture of 645 lbs. of a mixture of solid ammonium sulfate and solid ammonium nitrate, 534 lbs. of potassium salts with 220 lbs. of filler and granulating aids, 252 lbs. of 75% sulfuric acid and 264 lbs. of substantially anhydrous nitrogen solution. Additional solution-nitrogen could have been used but a very high nitrate level was desired.

The above reaction product agglomerated readily to give a commercially dry product having the following analysis:

| | |
|---|---|
| Percent nitrogen_____ | 15.56 |
| Percent ammonia nitrogen_____ | 10.72 |
| Percent $NO_3$ nitrogen_____ | 4.78 |
| Percent potash_____ | 16.41 |
| Percent water_____ | 0.6 |

Using a batch, rotating drum, mixer, a sample of 5–10–15 mixed fertilizer was prepared by treating 1075 lbs. of normal superphosphate, 510 lbs. of muriate of potash, 100 lbs. of limestone, and 118 lbs. of filler, with 222 lbs. of substantially anhydrous nitrogen solution. Some granulation was obtained and the particles were about the size of medium coarse sand. The product was a completely reacted commercially dry fertilizer which stored well. The phosphate did not revert in storage.

| | ° F. |
|---|---|
| Temperature of product from the mixer_____ | 190–220 |
| Temperature of the product going into storage__ | 170 |
| Temperature of product after one day storage__ | 165 |
| Temperature of product after ten day storage___ | 110 |

*Analysis of Samples*

| | Taken after 1 day stg. | Taken after 10 day stg. |
|---|---|---|
| Percent total nitrogen in prod_____ | 4.90 | 5.07 |
| Percent total $P_2O_5$_____ | 10.73 | 10.35 |
| Percent citrate insol. $P_2O_5$_____ | 0.42 | 0.34 |
| Percent APA_____ | 10.31 | 10.01 |
| Percent potash_____ | 15.84 | 15.84 |
| Percent water_____ | 2.32 | 2.60 |

Our improved process can be employed for the production of various combinations of nitrogen, potassium and phosphorus fertilizer mixtures. It can be employed with particular advantage in the production of nitrogen-potassium, nitrogen-phosphorus, and nitrogen-phosphorus-potassium mixtures of high plant food content with minimum or no drying and with reduced reversion tendencies. The use of substantially anhydrous nitrogen solutions in accordance with our improved process permits improved process control, improved control of quality and lower production costs. These solutions, for example, give the operator better control of the amount of liquid phase employed in the agglomeration operation, thereby promoting desired types of agglomeration. If small amounts of water are needed for better control in agglomerating low-analysis fertilizers, they can be added either hot, cold or as steam, and the water can be injected at any desired point in the mixer. Likewise, the use of substantially anhydrous nitrogen solutions permits the ready incorporation of substantially more solution nitrogen into a mixed fertilizer without developing an excessive liquid phase. The increased flexibility and better control of processing conditions assist in making uniform high quality fertilizers of any grade or formula. The finished fertilizers are not only drier, but harder granules are produced as a result of the rapid crystallization which occurs in the higher concentration of salts in the hotter liquid phase. Production costs are lower because of better control of operating conditions, quicker start-ups of the ammoniator, reduced need for additional drying, better over-all efficiency, and the use of low priced raw materials, etc.

Now having described our invention, what we claim is:

1. In a process for the production of solid nitrogen-containing fertilizers, the step which consists of reacting a substantially anhydrous nitrogen solution consisting essentially of substantially anhydrous ammonium nitrate and substantially anhydrous ammonia and an acidic material with controlled amount of liquid which acidic material reacts exothermically with ammonia.

2. The process of claim 1 wherein the acidic material is a solid inorganic acid phosphate.

3. The process of claim 1 wherein the acidic material is an inorganic acid which reacts exothermically with ammonia.

4. The process of claim 1 wherein the acidic material is selected from the group consisting of normal superphosphate and triple superphosphate.

5. The process of claim 1 wherein the acidic material is selected from the group consisting of sulfuric acid, phosphoric acids and nitric acid.

6. The process of claim 1 wherein the substantially anhydrous nitrogen solution contains urea.

7. The process of claim 1 wherein the substantially anhydrous nitrogen solution contains not substantially in excess of 0.2 to 0.8% water.

8. The process of claim 1 wherein the substantially anhydrous nitrogen solution contains 40 to 85% substantially anhydrous ammonium nitrate and 60 to 15% substantially anhydrous ammonia.

9. In a process for the production of solid nitrogen-containing solid fertilizers, the steps which comprise reacting a solution of substantially anhydrous nitrogen solution consisting essentially of substantially anhydrous ammonium nitrate and substantially anhydrous ammonia with solid fertilizer material comprising predominately phosphate and potash constituents and an acid selected from the group consisting of sulfuric, phosphoric and nitric acids with controlled amount of liquid, the amount of ammonia present in said nitrogen solution being sufficient to neutralize said acid and said phosphate, while agitating said reaction mixture.

10. In a process for the production of solid nitrogen-containing solid fertilizers the steps which comprise reacting a solution of substantially anhydrous nitrogen solution consisting essentially of substantially anhydrous ammonium nitrate and substantially anhydrous ammonia with solid fertilizer material comprising predominately phosphate constituents and an acid selected from the group consisting of sulfuric, phosphoric and nitric acid with controlled amount of liquid, the amount of ammonia present in said nitrogen solution being sufficient to neutralize said acid and said phosphate, while agitating said reaction mixture.

11. In a process for the production of solid nitrogen-containing solid fertilizers the step which comprises reacting a solution of substantially anhydrous nitrogen solution consisting essentially of substantially anhydrous ammonium nitrate and substantially anhydrous ammonia with solid fertilizer material comprising predominately potash constituents and an acid selected from the group consisting of sulfuric, and nitric acids with controlled amount of liquid, the amount of ammonia present in said nitrogen solution being sufficient to neutralize said acid, while agitating said reaction mixture.

12. In the process of producing solid mixed fertilizer in granulated form the steps which comprise mixing solid fertilizer materials comprising predominately phosphate and potash constituents, thereafter introducing simultaneously but separately, substantially anhydrous nitrogen solution consisting essentially of substantially anhydrous ammonium nitrate and substantially anhydrous ammonia and an acid selected from the group consisting of sulfuric, phosphoric and nitric acids with controlled amount of liquid into direct contact with the said solid fertilizer material, the ammonia in said nitrogen solution being in sufficient amount to neutralize said acid and said phosphate.

13. In a process of producing solid mixed fertilizer in granulated form the steps which comprise mixing solid fertilizer materials comprising predominately phosphate constituents, thereafter introducing simultaneously but separately, substantially anhydrous nitrogen solution consisting essentially of substantially anhydrous ammonium nitrate and substantially anhydrous ammonia and an acid selected from the group consisting of sulfuric, phosphoric and nitric acids with controlled amount of liquid into direct contact with the said solid fertilizer material, the ammonia in said nitrogen solution being in sufficient amount to neutralize said acid and said phosphate.

14. In a process of producing solid mixed fertilizer in granulated form the steps which comprise mixing solid fertilizer materials comprising predominately potash constituents, thereafter introducing simultaneously but separately, substantially anhydrous nitrogen solution consisting essentially of substantially anhydrous ammonium nitrate and substantially anhydrous ammonia and an acid selected from the group consisting of sulfuric and nitric acids with controlled amount of liquid into direct contact with the said solid fertilizer material, the ammonia in said nitrogen solution being in sufficient amount to neutralize said acid.

15. The process of claim 12 wherein said substantially anhydrous nitrogen solution comprises 40 to 85% of substantially anhydrous ammonium nitrate and 60 to 15% of substantially anhydrous ammonia.

16. The process of claim 12 wherein said substantially anhydrous nitrogen solution contains urea.

References Cited in the file of this patent

UNITED STATES PATENTS

| | | |
|---|---|---|
| 1,931,768 | Moore | Oct. 24, 1933 |
| 2,067,931 | Kniskern et al. | Jan. 19, 1937 |
| 2,885,279 | Mortenson | May 5, 1959 |
| 2,893,858 | MacDonald et al. | July 7, 1959 |
| 2,945,747 | Nielsson | July 19, 1960 |